Patented Nov. 27, 1934

1,982,120

UNITED STATES PATENT OFFICE 1,982,120

DESULPHURIZING RECOVERED PETROLEUM PHENOLS

Johan C. D. Oosterhout, Port Arthur, Tex., assignor to The Texas Company, New York, N. Y., a corporation of Delaware No Drawing. Application May 11, 1933, Serial No. 670,510

7 Claims. (Cl. 260—154)

This invention relates to a method of desulphurizing the phenolic compounds recoverable from petroleum hydrocarbons or from the products obtained by cracking the same.

There are present in the light petroleum fractions such as naphtha as well as in the naphthas obtained by cracking petroleum, small percentages of phenolic bodies. These phenolic bodies include phenols, cresols, xylenols and phenolic bodies above the xylenol range. They may be extracted and removed from the petroleum hydrocarbons with which they are associated by washing with alkaline solutions of various kinds. In actual practice it is found that spent caustic soda prewash solutions as well as spent sweetening solutions contain considerable quantities of these phenolic compounds in the form of the sodium salts. By acidifying these alkaline solutions the sodium salts may be decomposed to yield the original phenolic bodies.

As recovered, the phenolic bodies are contaminated with small percentages of the corresponding thiophenol compounds. The thiophenols being characterized by a most unpleasant, penetrating odor, their presence in the recovered phenolic bodies renders the same valueless for many uses.

Sulphur compounds of the thiophenol type are exceedingly refractory to treatment and sharing as they do the structural characteristics of the phenols, the methods of treatment which serve to decompose the thiophenols also generally result in the decomposition of the phenols.

I have found that by vaporizing the crude phenolic bodies containing the undesirable thiophenolic compounds and then passing the vapors through a bed of weathered lead sludge maintained at a temperature in the neighborhood of 500° F. or higher, a complete removal of the thiophenol compounds is possible.

The term "lead sludge" is used to designate the by-product lead sulphide resulting from sweetening of light petroleum distillates with alkaline sodium plumbite solutions and elementary sulphur. The lead sulphide precipitated in this way is usually allowed to accumulate in open tanks or pits by the oil refiners. In the course of its storage with access to air, an oxidation of the lead sulphide takes place which may be referred to as "weathering".

Analyses of weathered lead sludge have revealed that it comprises lead oxide, lead carbonate, lead sulphate, and unreacted lead sulphide. No definite composition can, however, be given since the quantities of the various oxidation products present vary widely in different samples.

In order to more clearly illustrate my invention a description of a typical desulphurization operation is given herewith: A portion of crude phenolic bodies recovered from cracked naphtha by treatment of the same with an alkaline solution was used as the charging material. This material gave the following tests upon examination:

Specific gravity_____ 1.03 at 60° F.
Elementary composition
  Carbon _____ 76.6
  Hydrogen _____ 7.73
  Oxygen _____ 14.90
  Sulphur _____ 0.74
  Appearance_____ Reddish brown, homogeneous liquid
  Odor_____ Rank, mercaptan-like not distinctly phenolic The crude phenolic bodies were vaporized in a still and the vapors so evolved were then immediately passed through a bed of weathered lead sludge maintained at a temperature of approximately 500° F. The vapors treated in this way were condensed and collected. The liquid gave the following tests:

Specific gravity_____1.03 at 60° F.
Elementary composition
  Carbon_____ 79.02
  Hydrogen_____ 7.78
  Oxygen_____ 13.2
  Sulphur_____ None
  Appearance_____Clear, water-white liquid
  Odor_____Sweet, phenolic in character In using beds of weathered lead sludge having considerable depth, it may be found advantageous to combine therewith varying proportions of porous materials such as fuller's earth, kieselguhr, or similar filter-aid materials which impart greater porosity to the reaction bed. The incorporation of such materials with the weathered lead sludge catalyst permits of more rapid throughput through the reaction bed and also prevents any undesirable packing or settling effects which tend to increase the pressures necessary to force the vapors through the layer of the catalyst.

Whenever it is found that the efficiency of the catalyst material is falling off, which is indicated by the detection of sulphur in the vapors which have been subjected to treatment, several methods of revivification are possible. The bed of weathered lead sludge may be blown with air or flue gas at an elevated temperature or else the spent weathered lead sludge may be removed and placed in an open storage pit or tank where air oxidation may take place. In some cases where the spent catalyst is weathered it may be desirable to moisten it with a solution of an alkaline material such as caustic soda which appears to catalyze the oxidation or weathering action.

In those cases where the recovered phenolic bodies contain considerable quantities of high molecular weight compounds, it may be found advisable to fractionate the vapors of the phenolic bodies in the course of the distillation operation and to remove the high molecular weight compounds. This obviates any possibility of the undesirable hydrocarbons becoming adsorbed on the catalyst and in this way reducing its desulphurizing activity.

Although the use of a temperature of 500° F. has been mentioned, higher temperatures than this may be used, the limit being the temperature at which the phenols undergoing treatment are decomposed or cracked. In most operations of the present process, it will be found advantageous to maintain the catalyst at a temperature of approximately 100° F. higher than the normal boiling point of the phenols undergoing desulphurization.

Obviously many modifications and variations of the invention, as hereinbefore set forth, may be made without departing from the spirit and scope thereof, and therefore only such limitations should be imposed as are indicated in the appended claims.

I claim:

1. A method of removing undesirable thiophenol compounds from phenols recovered from petroleum hydrocarbons which comprises vaporizing the phenols and passing them through a bed of weathered lead sludge maintained at a temperature above the boiling point of the phenols and below the temperature at which any substantial cracking occurs.

2. A method of removing undesirable thiophenol compounds from phenols recovered from petroleum hydrocarbons which comprises vaporizing the phenols and passing them through a bed of weathered lead sludge maintained at a temperature of between 500° F. and the temperature at which substantial cracking takes place.

3. A method of removing undesirable thiophenol compounds from phenols recovered from petroleum hydrocarbons which comprises vaporizing the phenols and passing them through a bed of desulphurizing catalyst comprising a mixture of weathered lead sludge and a porous filter-aid material maintained at a temperature above the boiling point of the phenols and below the temperature at which substantial cracking occurs.

4. A method of removing undesirable thiophenol compounds from phenols recovered from petroleum hydrocarbons which comprises vaporizing the phenols and passing them through a bed of desulphurizing catalyst comprising a mixture of weathered lead sludge and a porous filter-aid material maintained at a temperature of between 500° F. and the temperature at which substantial cracking takes place.

5. A method of desulphurizing phenolic bodies recovered from petroleum hydrocarbons which comprises vaporizing the phenolic bodies and contacting them in the vapor state with weathered lead sludge maintained at a temperature above the boiling point of the phenolic bodies.

6. A method of desulphurizing phenolic bodies recovered from petroleum hydrocarbons which comprises vaporizing the phenolic bodies and contacting them in the vapor state with weathered lead sludge maintained at a temperature of approximately 100° F. higher than the boiling point of the phenolic bodies.

7. In the desulphurization of phenolic bodies recovered from petroleum hydrocarbons by passing the vapors through a bed of weathered lead sludge, the steps which comprise alternately passing the vapors through the bed of lead sludge and then blowing the bed with oxygen-containing gases to reactivate the same for treating further quantities of the vapors of the phenolic bodies.

JOHAN C. D. OOSTERHOUT.